United States Patent Office 3,457,908
Patented July 29, 1969

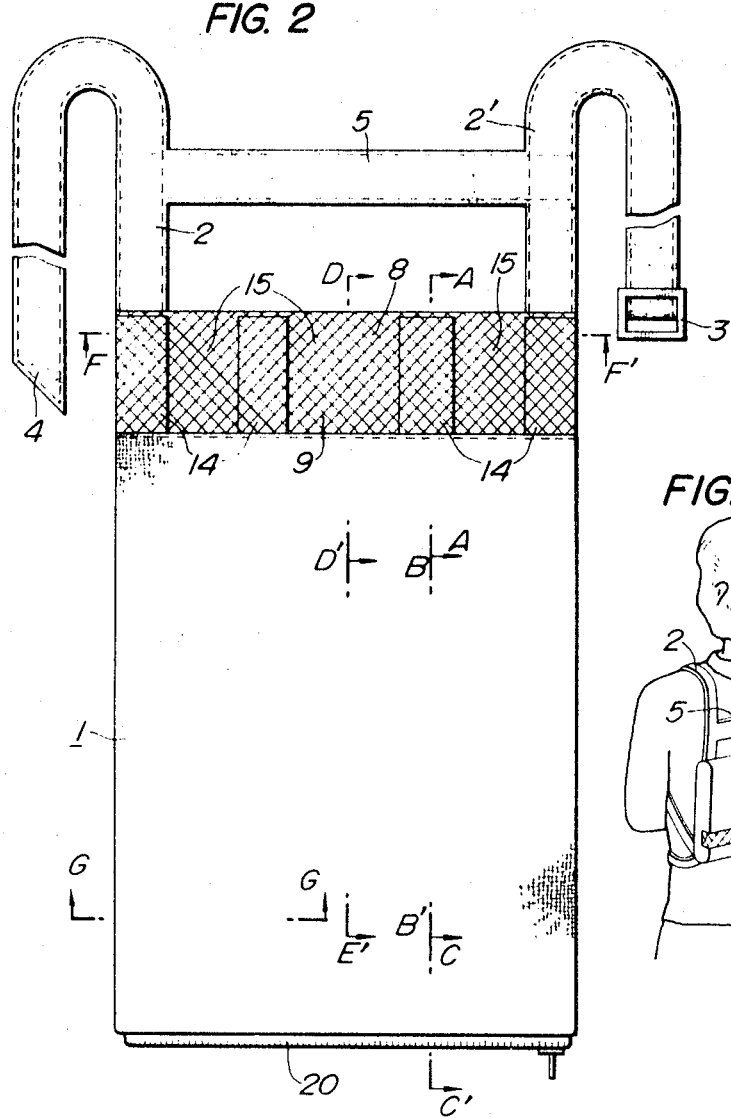
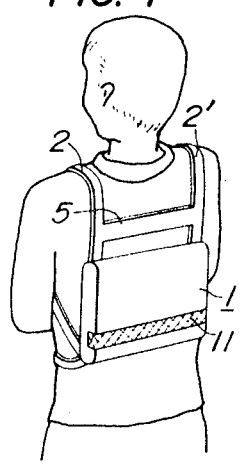
FIG. 2
FIG. 1

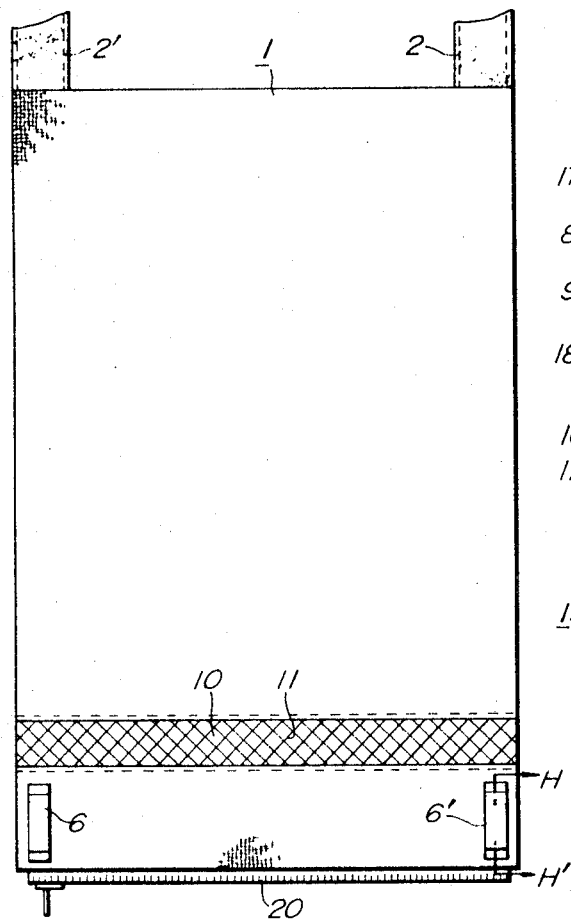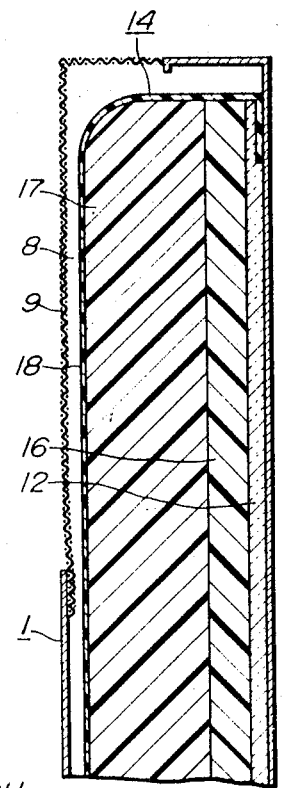

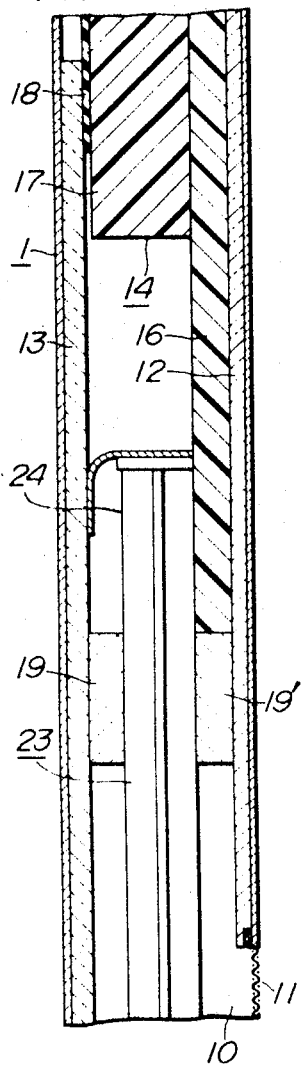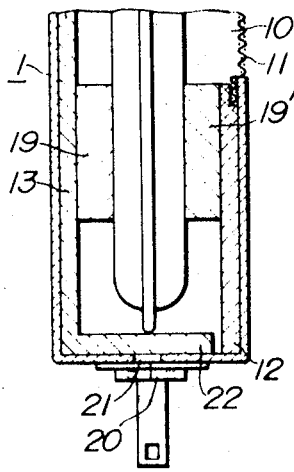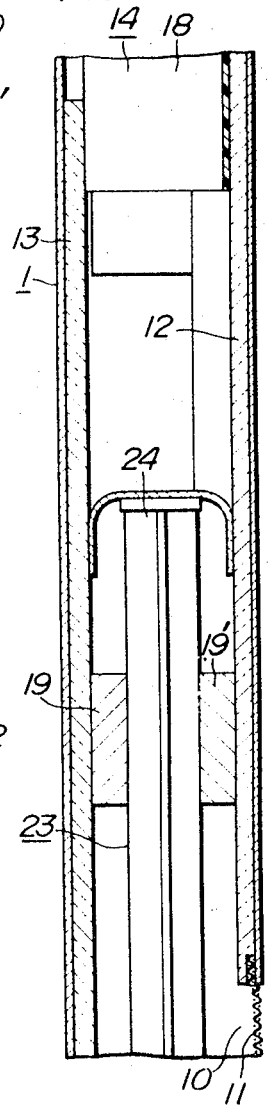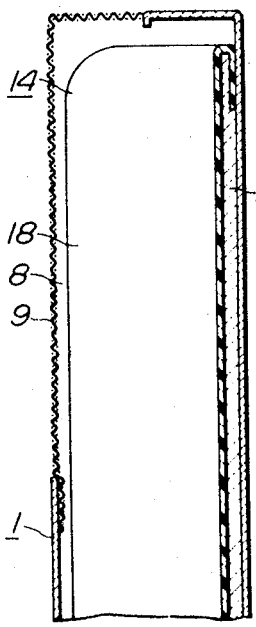

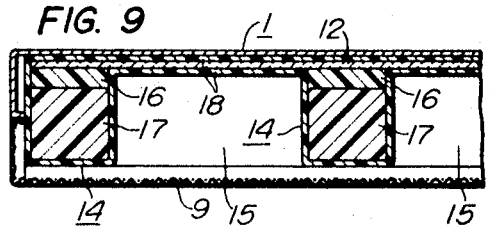
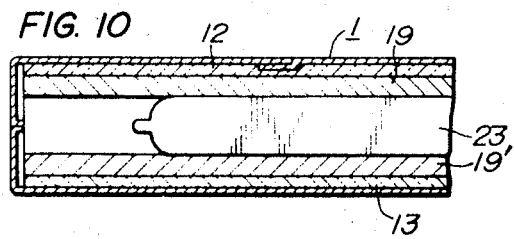
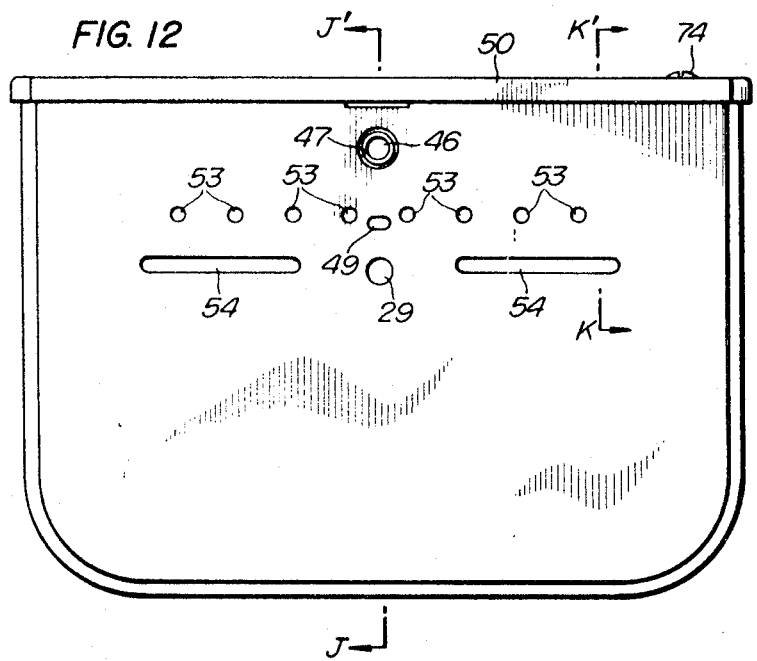

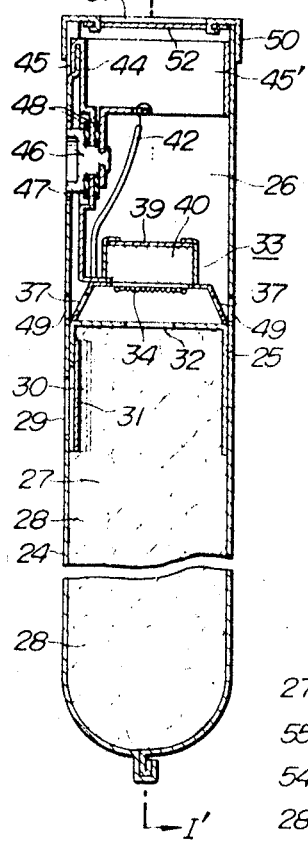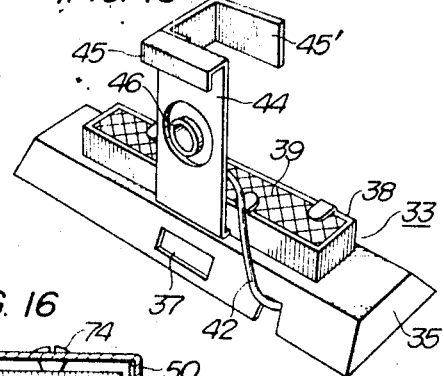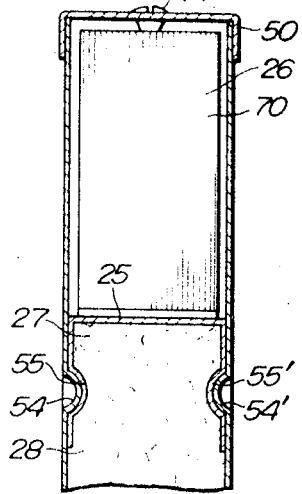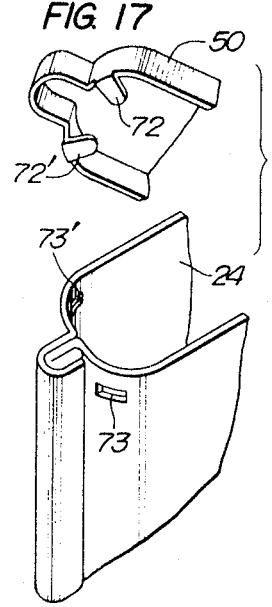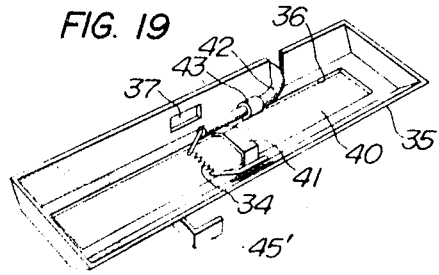

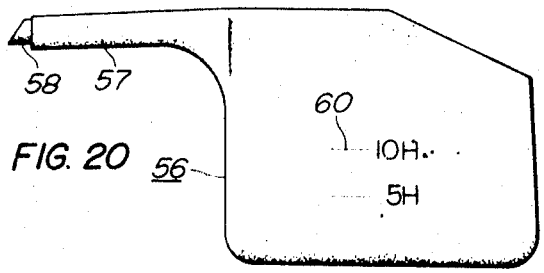
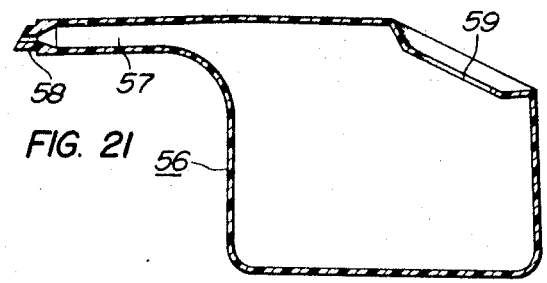
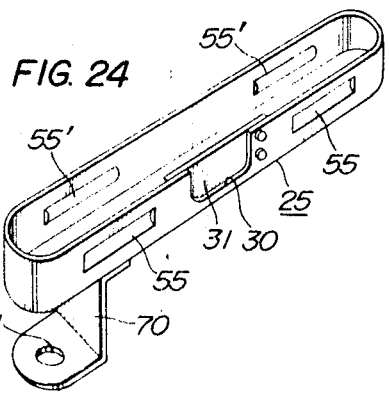
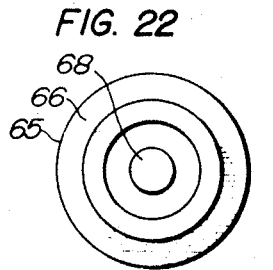
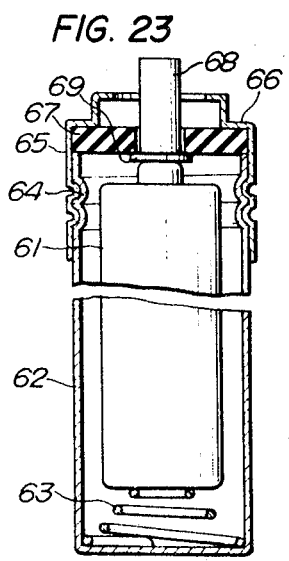

3,457,908
BODY WARMER
Masaru Hamatani, Yamoto-Koriyama-shi, and Kanau Kawauchi, Nara-ken, Japan, assignors to Matsushita Electric Industrial Co., Ltd., Osaka, Japan, a corporation of Japan
Filed Dec. 18, 1967, Ser. No. 691,321
Claims priority, application Japan, Dec. 29, 1966, 42/1,188
Int. Cl. A61f 7/06
U.S. Cl. 126—208    7 Claims

ABSTRACT OF THE DISCLOSURE

A body warmer for warming the body of the wearer locally by the heat from a burner element disposed in a bag structure which is retained on a portion of the body desired to be warmed by means of belts or the like.

---

The present invention generally relates to a body warmer and more particularly relates to a body warmer which comprises a bag structure and a burner element adapted to burn a liquid fuel, such as benzine, and disposed in said bag structure, and which is adapted to be retained on a portion of the body of the wearer to warm said portion with the heat from said burner element dissipated within said bag structure.

It is an object of the present invention to provide a body warmer capable of warming a large area of the body of the wearer, e.g. the entire area of the back of the wearer, by the heat generated in a burner element by the combustion of a liquid fuel, such as benzine, and dissipated over said area.

It is another object of the present invention to provide a body warmer of the type set forth above, in which the burner element is effectively disposed in a bag structure and means is provided to produce a smooth circulation of air through said burner element so as to effect good heat conduction and heat convection in said bag structure and thereby enhance the warming effect of the bag body.

It is still another object of the present invention to provide a body warmer of the type set forth above, in which ribs provided in the bag structure to define heat radiating passages are flexible, whereby the body warmer is always held in intimate contact with the portion of the body to be warmed while securing the heat radiating passages effectively, even when the body of the wearer is in motion.

It is still another object of the present invention to provide a body warmer of the type set forth above, in which the combustion efficiency of a fuel is enhanced by the chimney effect developed by a combustion chamber in the burner element, which chimney effect promotes the catalytic combustion of the fuel in a catalyst-carrying mat disposed in said burner element.

It is still another object of the present invention to provide a body warmer of the type set forth above, in which a provision is made to supply a sufficient amount of gasified fuel to an ignition heater, so that the burner element can be ignited positively.

It is still another object of the present invention to provide a body warmer of the type set forth above, in which the mat, the ignition heater, a mounting base for said mat and said ignition heater, and a terminal mounting member, composing a combustion unit, are assembled in a unitary form so as to facilitate the repair and assembling works of the body warmer.

It is still another object of the present invention to provide a body warmer of the type set forth above, which is provided with tightening belts so that the body warmer may be fitted on the body of the wearer to obtain a good warming effect during use.

Other objects, features and advantages of the present invention will become apparent from the following detailed description with reference to a particular embodiment thereof illustrated in the accompanying drawings, in which:

FIGURE 1 is a perspective view of the body warmer of this invention as applied to the body of the wearer;

FIGURE 2 is a front elevational view, partially broken away, of the body warmer;

FIGURE 3 is a back view, partially broken away, of the body warmer;

FIGURE 4 is a fragmentary cross sectional view taken on the line A–A′ of FIGURE 2;

FIGURE 5 is a fragmentary cross sectional view taken on the line B–B′ of FIGURE 2;

FIGURE 6 is a fragmentary cross sectional view taken on the line C–C′ of FIGURE 2;

FIGURE 7 is a fragmentary cross sectional view taken on the line D–D′ of FIGURE 2;

FIGURE 8 is a fragmentary cross sectional view taken on the line E–E′ of FIGURE 2;

FIGURE 9 is a fragmentary cross sectional view taken on the line F–F′ of FIGURE 2;

FIGURE 10 is a fragmentary cross sectional view taken on the line G–G′ of FIGURE 2;

FIGURE 11 is a fragmentary cross sectional view taken on the line H–H′ of FIGURE 3;

FIGURE 12 is a front elevational view of a burner element used in the body warmer;

FIGURE 15 is a cross sectional view, partially broken away, of the burner element taken on the line J–J′ of FIGURE 12;

FIGURE 16 is a fragmentary cross sectional view taken on the line K–K′ of FIGURE 12;

FIGURE 17 is a fragmentary exploded perspective view for the purpose of explaining the engagement between a fuel tank constituting the burner element and a closure cap for said fuel tank;

FIGURE 18 is a perspective view showing the critical portion of the body warmer;

FIGURE 19 is a perspective view showing the backside of the portion of the body warmer shown in FIGURE 18;

FIGURE 20 is a front elevational view of a fuel supply cup;

FIGURE 21 is a cross sectional view of the fuel supply cup;

FIGURE 22 is a top view showing a half portion of an ignition cell unit;

FIGURE 23 is a vertical cross sectional view, partially broken away, of the ignition cell unit; and FIGURE 24 is a perspective view of a partition member to separate a combustion chamber and a fuel chamber in the burner element from each other.

Figure 13:
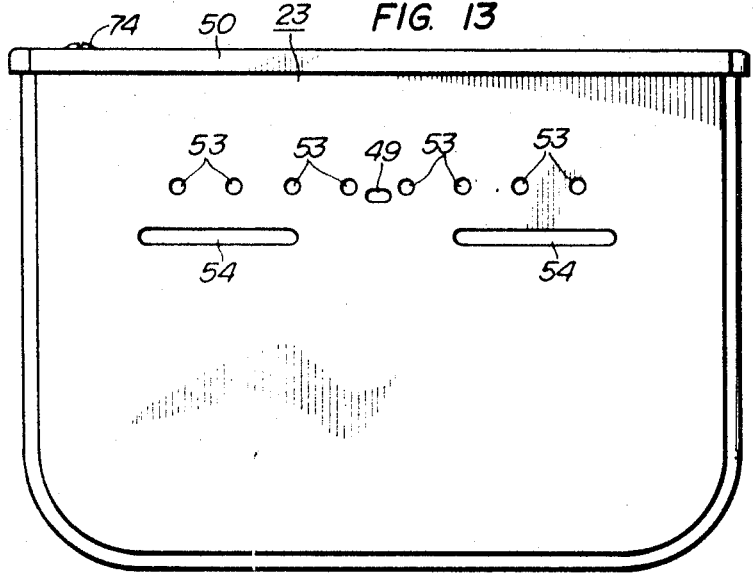
FIGURE 13 is a back view of the burner element shown in FIGURE 12.

Referring to FIG. 2, the principal body 1 of the body warmer is made of two sheets of a flexible material, such as a woven fabric, a synthetic resin or a film, which are sewed or glued together at their edges to form a bag structure. The body thus formed is used in a flat state as shown in FIG. 1.

The body 1 has a pair of tightening belts 2 and 2′ of the same material as said body connected to the opposite ends of the top side thereof by sewing or by means of an adhesive for securing the body warmer on the body of the wearer thereby. The tightening belt 2′ is provided at its free end with a buckle which is made of a metallic material, such as iron, or a synthetic resin material, whereas the tightening belt 2 has its free end sharpened as at 4 so as to facilitate the insertion of the same into the buckle 3. Both belts 2 and 2' are bridged by a lateral strip 5 of the same material as the body 1 at a point 10 to 150 mm. above the top side of the body 1, said bridging strip 5 being connected to the respective belts by sewing or by means of an adhesive.

The body 1 is also provided at the lower corners on the backside thereof with a pair of straps 6 and 6', as shown in FIG. 3. These straps are made of such material as a woven fabric, a synthetic resin or a film, or a metallic material, such as iron, and sewed or glued to the body 1. Each of these straps, as shown in FIG. 11, defines a through-hole 7 or 7' between it and the body 1, through which the tightening belt 2 or 2' is passed to tightly secure the body warmer on the body of the wearer in the manner as shown in FIG. 1.

In the upper portion of the front wall or the inner wall of the bag-shaped body 1 of the body warmer, which is to be brought into contact with the body of the wearer, is provided a heat releasing opening 8 which is covered by a protective screen 9. The protective screen 9 is made of a flexible material, such as a thread, a synthetic resin or a cloth, and connected to the body 1 by sewing or by means of an adhesive as shown in FIG. 2. On the other hand, in the lower portion of the backside of the body 1 is formed an air intake opening 10 as shown in FIG. 3. This air intake opening 10 is also covered by a protective screen 11, in the same manner as the heat releasing opening 8.

The structure of the upper portion of the body 1, including the protective screen 9 covering the heat releasing opening 8, is shown in FIG. 2. As shown, the inner surface of the back wall is entirely lined with a layer of flexible, non-heat conductive, heat insulating material 12, such as a woven fabric or a felt, which is sewed or adhesively bonded to said surface. The inner surface of that portion of the front wall other than the protective screen 9 is also substantially entirely lined with a layer of heat insulating material 13 as shown in the cross sectional view of FIG. 5, which is taken on the line B-B' of FIG. 2. Obviously, an opening is formed in the heat insulating layer 12 at a location corresponding to the screen cover 11 to form the air intake opening 10 as described previously.

On the upper portion of the inner surface of the heat insulating layer 12 are provided a plurality of vertically extending elongate, heat-resistant, flexible ribs as generally indicated by 14. These ribs 14 are spaced from each other to define a heat radiating passage 15 between adjacent ones. As shown in FIG. 4, each of these ribs 14 is composed of two layers of different materials, consisting of a layer 16 of relatively hard, flexible material, such as a felt, a woven fabric or a synthetic resin, which is in contact with the heat insulating layer 12, and a layer 17 of relatively soft foamed resin material, such as polyurethane, which is superposed on said layer 16, said two layers 16 and 17 being bonded together by means of an adhesive.

The exposed surfaces of the ribs 14 and the heat insulating layer 12 are entirely coated with an air-impermeable coating 18 such as a vinyl film or a polyethylene film, as shown in FIGS. 4 and 7.

A plurality of pairs of laterally extending ribs 19 and 19' are provided on the lower portions of the inner surfaces of the heat insulating layers 12 and 13 or the inner surfaces of the body 1. At the bottom end of the body 1 is provided a fastener 20 such as a zipper as shown in FIG. 6, for opening or closing a slit 21 formed in the bottom end of the body 1. The slit 21, as shown in FIG. 6, is covered by a flexed extension 22 of the heat insulating layer 13 to intercept the heat being released therethrough.

A burner element 23 has the top end thereof secured by a plurality of bands 24 of a flexible material such as a woven fabric or a synthetic resin. Each of these bands 24 has both ends fixed to the respective heat insulating layers 12 and 13. The burner element 23 is secured at its sides by the aforesaid plurality of pairs of lateral ribs 19 and 19' as shown in FIGS. 5 and 8. The bottom end of the burner element 23 rests on the extension 22 of the heat insulating layer 13 as shown in FIG. 6.

Figure 14:
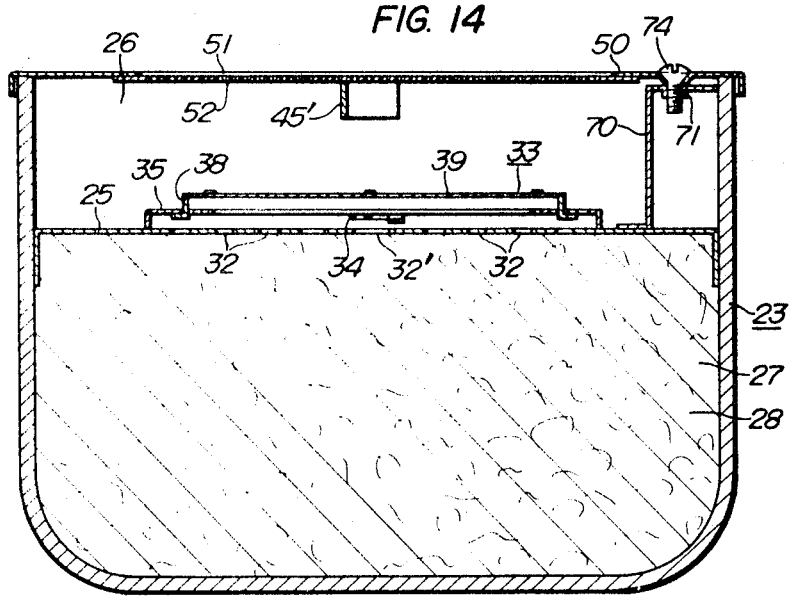
FIGURE 14 is a vertical cross sectional view of the burner element.

The burner element 23 consists of a bottomed metallic tank 24 which is rectangular in transverse cross section and, as shown in FIG. 14, the interior of the tank 24 is divided into a combustion chamber 26 and a fuel chamber 27 by a partition member 25. The fuel chamber 27 is stuffed with an absorbent material 28 consisting of absorbent cotton and saturated with benzine. As shown in FIG. 15, a fuel supply hole 29 is formed in one side wall of the fuel chamber 27, while a notch 30 is formed in the side wall of the partition member 25 at a location corresponding to said fuel supply hole 29. The notch 30 is covered from the interior by a closing member 31 consisting of a leaf spring. The partition member 25 has a plurality of fuel gas passage holes 32 formed in the top wall thereof, as shown in FIG. 14, and, of these fuel gas passage holes, the one indicated by 32' which is located opposite to an ignition heater 34 of a combustion unit 33 disposed in the combustion chamber 26, is greater in diameter than the rest of the holes 32.

The combustion unit 33, as shown in FIGS. 18 and 19, is composed of the heater element for the ignition of the gasified fuel, a combustion element in which flameless combustion of the gasified fuel takes place and a terminal element for supplying a power to said heater element. A mounting base 35 of the combustion unit 33 is made of a metal and has a trapezoidal shape in cross section, with the bottom thereof opened. The mounting base 35 has an opening 36 formed in the top wall thereof for the passage of the gasified fuel therethrough and a window 37 formed in each side wall for the inspection of the ignition heater 34 therethrough. The lower edges of the side walls of the mounting base 35 are fitted in the corners formed by the inner wall of the tank 24 and the top wall of the partition member 25.

A mat retainer 38 constituting the combustion element is fixedly mounted on the top wall of the mounting base 35. The top opening of the mat retainer 38 is covered by a porous sheet material 39, such as a metal screen, to provide for the passage of combustion gases therethrough and the interior of the mat retainer 38 is filled with a glass mat 40 which has a platinum catalyst attached to the surface thereof. A substantially U-shaped metallic strap 41 is fixed to the backside of the mounting base 35 to support a lead 42 which is extending into the backside of said mounting base and secured thereto by a fitting 43 at a point adjacent the aforesaid support strap 41. The lead 42 is shrouded with a heat resistant insulating sheath of, e.g., asbestos. The terminal end of the core wire of the lead 42 is opposed by an end of a support rod which is made of the same material as the core wire of the lead 42 and secured to the support strap 41, and a resistance wire 34 such as platinum-rhodium wire is extended across the ends of said lead and said support rod to constitute an ignition heater. In this case, the heater 34 is located at the center of the glass mat 40 in contact therewith.

The terminal element consists of a metallic terminal mounting plate 44 which has the lower portion clamped between the top wall of the mounting base 35 and the lower edge of the mat retainer 38. The upper portion of the terminal mounting plate 44 is flexed as at 45 for engagement with the top edge of the tank 24. A terminal 46 is securely mounted on an intermediate portion of the terminal mounting plate 44. That portion of the tank wall which is engaged by the flexed top end of the terminal mounting plate 44 is joggled inwardly, so that the exterior surface of the flexed end of said terminal mounting plate, when in interlocking engagement with the top edge of the tank wall, may be flush with the outer surface of said tank wall. An arm 45' is welded to the top portion of the inner surface of the terminal mounting plate 45, which arm serves as a reinforcing rib for the tank 24 as shown in FIG. 15. A through-hole 47 is formed in the side wall of the tank 24 at a location confronting a terminal 46.

The terminal 46 is mounted on the terminal mounting plate 44 through the intermediary of insulating plates 48 and has the other end of the core wire of the lead 42 connected thereto. The side walls of the tank 24 are also provided with inspection windows 49 respectively, in register with the corresponding inspection windows 37 in the side walls of the mounting base 35 of the combustion unit 33. The top opening of the tank 24 is covered by a cap 50. The cap 50 has a through-hole 51 formed in the top wall thereof, which is covered by a porous sheet material 52, such as a metal screen, to provide for the passage of the hot gases therethrough. As shown in FIG. 12, a plurality of gas passage holes 53 are formed in each side wall of the tank 24 at locations corresponding to the glass mat 40 for communication with the combustion chamber 26 in said tank.

At one end portion of the top wall of the partition member 25 is provided a metallic support member 70 of, e.g., iron, as shown in FIG. 24. This support member 70, as seen in FIG. 14, has substantially the same height as the height of the combustion chamber 26 and is secured at its lower end to the top surface of the partition member as by spot welding. In the other end portion of the support member 70 is formed an internally threaded hole 71. As shown in FIG. 17, the cap 50 is provided at one end thereof with nails 72 and 72', whereas the side walls of the tank 24 are formed in the upper portion thereof with slits 73 and 73' for engagement with said nails 72 and 72'. In mounting the cap 50 on the top opening of the tank 24, the nails 72 and 72' are, first of all, engaged in the corresponding slits 73 and 73' in the tank walls and then the other end of the cap is secured to the support member 70 by means of a screw 44 which is screw-threaded in the internally threaded hole 71 in said support member 70. The partition member 25 is secured to the tank by interlocking engagement between indents 55 and 55', formed in the side walls thereof, and corresponding projections 54 and 54', formed on the inner surfaces of the side walls of said tank, as shown in FIG. 16.

Referring to FIGS. 20 and 21, there is shown a fuel supply cup 56. This fuel supply cup 56 is formed integrally of a synthetic resin, e.g. polyethylene, and has a beak 57 extending from one end thereof, with a sharp-angled nozzle 58 formed at the end extremity. The outer diameter of the beak 57 is greater than the diameter of the fuel supply hole 29 in the side wall of the tank 24 but the outer diameter of the nozzle 58 is smaller than the latter. The fuel supply cup 56 is also provided with a fuel inlet opening 29 in the top wall thereof. On one side wall of the fuel supply cup 56 is provided markings 60 which serve to make the amount of the liquid fuel, having been consumed by the burner element 23, known to the user.

FIGS. 22 and 23 show the structure of a casing for a dry cell 61 for the ignition of the burner element 23. The body 62 of the casing consists of a bottomed cylinder formed with a metal sheet, such as aluminum sheet, and a contact spring 63 of a conductive material is disposed in the bottom thereof. On the contact spring 63 is mounted the dry cell 61 and a metal cap 65 is screw-threaded on an external thread 64 formed by the top end portion of the casing 62. The metal cap 65 is provided at the upper portion thereof with a shoulder 66 and a terminal rod holder 67 of an electric insulating material, such as a synthetic resin, is interposed between said shoulder 66 and the top edge of the casing body 62. The terminal rod holder 67 has a through-hole bored in the center thereof, through which a metallic terminal rod 68 extends slidably. The terminal rod 68 is formed at its inner end with a stopper flange 69 which retains said terminal rod in contact with the positive electrode of the dry cell 61. The positive electrode of the dry cell 61 is held in pressure contact with the terminal rod 68 under the bias of the contact spring 63. The outer end of the terminal rod 68 is projecting outwardly through the cap 65.

In use of the body warmer of this invention constructed as described hereinabove, the burner element 23 is first of all removed from the body 1 of the body warmer through the slit 21 upon unfastening the fastener 20 and the nozzle 58 of the fuel supply cup 56 is forced into the fuel supply hole 29 in the side wall of the fuel tank 24 against the biasing force of the leaf spring 31 to pour a liquid fuel into the fuel chamber 27 in said tank, whereby the absorbent cotton in said fuel chamber 27 is saturated with the fuel. Upon completion of the fuel supply, the nozzle 58 of the fuel supply cup 56 is removed from the fuel supply hole 29, whereupon the fuel supply hole is closed by the leaf spring 31.

Thereafter, the terminal rod 68 of the dry cell unit is brought into contact with the terminal 46 of the combustion unit 33 through the opening 47, whereup a current is conducted through an electric circuit composed of the positive electrode of the dry cell 61, the terminal 46, the lead 42, the ignition heater 34, the support rod 41, the mounting base 35, the terminal mounting plate 44, the tank 24 and the negative electrode of the dry cell 61, and the heater 34 is red-heated. The fuel retained in the absorbent cotton 28 is successively gasified and the resultant fuel gas flows into the glass mat 40, through the passage holes 32 and 32' in the partition member 25, wherein it is ignited by the heater 34 and the heated gases flow outwardly through the screen 52 to be used for warming the body of the wearer. The energization of the ignition heater 34 by the current from the dry cell can be confirmed by the user through the inspection windows 49. The burner element 23 thus ignited is mounted in the body 1 of the body warmer and, after fastening the fastener 20, the body warmer is applied on the body of the user in the manner shown in FIG. 1. The warming effect of the body warmer can be further enhanced by an overcoat wore by the user on top of the body warmer.

During the use of the body warmer, air taken into the body warmer through the air intake opening 10 flows into the combustion chamber 26 in the burner element 23 through the passage holes 53 and the heated gases generated in the combustion chamber flow through the through-hole 51 and the heat radiating passages 15 in the body warmer 1 to be discharged to the outside through the heat releasing opening 8, producing an excellent heating effect.

In this case, since the tank 24 of the burner element 23 according to the present invention is divided by the partition member 25 into the fuel chamber 27 stuffed with the liquid fuel-saturated absorbent cotton 28, and the combustion chamber 26 having the platinum catalyst-carrying glass mat 40 disposed therein, said fuel chamber 27 and said combustion chamber 26 being in communication with each other through the passage hole 32 in said partition member, said combustion chamber 26 being in communication with the exterior of the burner element through the passage holes 53 formed in the side walls thereof at location corresponding to said glass mat and also through the passage hole 51 formed in the cap 50 mounted on the open top end of the tank 24, as described previously, the chimney effect is developed in the combustion chamber 26, promoting the catalytic combustion of the fuel in the glass mat and thereby enhancing the combustion efficiency of the burner element 23, with air flowing through the combustion chamber 26 smoothly through said passage holes 53 and said passage hole 51 above the glass mat 40.

Such advantageous effects of the burner element according to the present invention cannot be obtained from conventional burners of the type in which a platinum catalyst-carrying asbestos is placed in the top portion of a tank and enclosed entirely by a cover having a plurality of passage holes therein.

The provision of the combustion chamber 26 as in the burner element of this invention is also advantageous in that the wall thereof serves as a windbreaker, enabling the gasified fuel to be ignited positively even in a strong wind, protects the user against a burn caused by inadvertent contact with the heated mat 40 and further prevents the finger tips of the user from being stained by the soot.

It is also to be noted that, since in the burner element of this invention, one of the passage holes 32 in the partition member 25 which is opposed by the ignition heater 34 is made larger in diameter than the other holes as described before, that portion of the mat 40 in the proximity of the ignition heater 34 is supplied with more amount of gasified fuel than the other portion and accordingly the fuel gas can be ignited quickly positively, immediately after a current is conducted through said ignition heater.

The burner element of this invention is also advantageous in that, since the glass mat 40 with the platinum catalyst attached to the surface thereof is mounted in the mat retainer 38 having the through hole 36 formed in the top wall thereof and the mat retainer 38 is fixedly mounted on the top wall of the mounting base 35 having a trapizoidal shape in cross section, which mounting base in turn is mounted on the partition member 25 with the lower edges thereof being at least in contact with the inner wall of the tank 24, the gasified fuel is guided and led into the mat smoothly by the tapered walls of the mounting base 35, even when a gap is produced between the inner wall of the tank 24 and the side walls of the partition member 25, and thus it is possible to use the gasified fuel effectively and improve the combustion efficiency.

Another advantage of the burner element of this invention is that, since the ignition heater 34 is mounted on the mounting base 35 and the terminal mounting plate 44, with the terminal 46 mounted on an intermediate portion thereof through the intermediary of the insulating plates and having its top end portion disengageably secured to the top edge of the tank 24, is fixedly mounted at its lower end to the mounting base 35 to form an integral unit, repair work necessitated by breakage of the ignition heater 34 or deterioration of the glass mat 40 can be achieved readily by merely replacing the entire unit with a new one and in addition the assembly of the burner element can also be simplified.

Still another advantage of this invention is that, since the substantially U-shaped support strap 41, having the support rod fixed thereto, is fixedly mounted on the backside of the mounting base 35 to retain the lead 42 which is clasped by the insulating fitting 43 with its terminal end connected to the ignition heater 34, the other end of which is connected to the support rod, the strength of the mounting base 35 is augmented by said support strap 41, and further the assembly of the burner is rendered easy because the support stray 41 can be fixed to the mounting base 35 after connecting the ignition heater 34 to the lead and the support rod. Still another advantage of this invention is that, since the inspection windows 37 and 49 are formed in the side walls of the mounting base 35 and the tank 24 respectively in register with each other, the energization of the ignition heater 34, the degree of electricity consumption of the dry cell 61 and the failure of the ignition heater 34 can be conveniently inspected through said windows.

According to the present invention, the burner element 23 is mounted in the lower portion of the body 1 of the body warmer and the air intake opening 10 formed in the lower portion of the back wall of the body 1 is in communication with the heat releasing opening 8 formed in the upper portion of the front wall through the air passages 15 defined by the wall of the burner element 23 and the back wall of the body 1. Therefore, the chimney effect is produced in the body 1 promoting the smooth suction of air and smooth discharge of the heated gases, and thereby providing for complete combustion of the gasified fuel in the burner element 23, with a minimum amount of toxic gases being generated. Thus, the combustion efficiency can be enhanced remarkably. In addition, since the heated gases are distributed even in the top portion of the body 1 remote from the burner element 23 through the heat radiating passages 14, the body warmer is heated entirely and a satisfactory plane heating effect can be obtained, giving a confortable feeling to the wearer. Furthermore, since the heat releasing opening 8 is formed in the upper portion of the front wall of the body 1 which wall is in contact with the body of the wearer, while the air intake opening 8 is formed in the lower portion of the back wall of the body 1, the body of the wearer is heated directly by the warm air being discharged through said heat releasing opening 8 and not chilled by the cold air stream in the vicinity of the air intake opening 10. Still further, according to the present invention, a high thermal efficiency can be obtained because the burner element 23 is mounted in the lower portion of the body 1 and the heat generated in said burner element is prevented from dissipating through the back wall of the body due to the presence of the heat insulating layer 12 which is provided in substantially the entire area of the back wall, except for the air intake opening 10, the heat being dissipated only through the portion of the front wall which is not lined with the heat insulating layer 13. Even when the burner element is heated excessively, the wearer is protected against such heat by the heat insulating layer 13 on the inner surface of the front wall and thus the safety of the wearer is assured. Still further, according to this invention, the burner element 23 disposed in the lower portion of the body 1 is supported at both sides by the plurality of pairs of lateral ribs 19 and 19' which are fixed to the opposed inner surfaces of the front and back walls of the body 1, defining spaces between the walls of the burner element 23 and the heat insulating layers 12 and 13. These spaces enable air to be fed into the burner element 23 smoothly uniformly, so that the combustion of the fuel takes place always under uniform conditions and the temperature change of the body warmer with the lapse of time can be minimized. The direct contact of the burner element with the heat insulating layers 12 and 13 would result in softening of said layers, with the result that a gap is formed therebetween occasionally, and this makes it impossible to obtain a uniform supply of air to the burner element.

The tightening belts 2 and 2' extending from the top edge of the body 1 are bridged by the lateral strip 5 at a point 10 to 150 mm. above said top edge of the body 1. This lateral strip 5 effectively prevents the tightening belts 2 and 2' from slipping off the shoulder of the wearer.

The plurality of vertical ribs 14, provided on the upper portion of the inner surfaces of the body 1 to form the heat radiating passages 15 as described above, are each composed of two layers of different materials consisting of the layer 16 in contact with the heat insulating layer 12, which is made of a relatively hard flexible material such as a felt, a woven fabric or a synthetic resin, and the layer 17 superimposed on said layer 16, which is made of a relatively soft material consisting of a foamed resin such as polyurethane, said layers 16 and 17 being bonded together by means of an adhesive. Because of the flexibility of the materials composing the layers 16 and 17, the wearer will have a comfortable feeling and further, even when the layer 17 of the relatively soft material is deformed by an external force imposed thereon during use, the heat radiating passages 15 are always secured by the layer 16 of the relatively hard material, so that the combustion state of the fuel in the burner 23 and accordingly the amount of heat being released from the body warmer are maintained unchanged at all times. Since the heat insulating layer 12 and the aforesaid ribs 14 are covered by the layer 18 of an air-impermeable material, the heat generated in the body 1 can be utilized effectively without being dissipated through the back wall of the body 1. The escape of heat through the bottom end of the body 1 can be prevented effectively by the extension 22 of the heat insulating layer 13 which is flexed over the bottom end of the body 1 and on which the burner element 23 is mounted. Such arrangement also enhances the thermal efficiency of the body warmer.

It is also to be noted that, since the air intake opening 10 is covered by the screen 11, there is no danger of the user inadvertently touching the heated burner element 23 and this is convenient in handling of the body warmer and adds to the safety of the same.

What is claimed is:

1. A body warmer comprising a bag-shaped body composed of an inner wall or front wall to be brought into contact with the body of the wearer and an outer wall or back wall having its inner surface lined with a layer of heat insulating material, a burner element disposed in the lower portion of said body and flexible ribs provided in the upper portion of the body in spaced relation to define between adjacent ribs a heat radiating passage through which heated gases from said burner element pass, said body having an air intake opening formed in that portion of the outer wall thereof which confronts said burner element and a heat releasing opening formed in the upper portion of the inner wall in communication with the upper portion of said heat radiating passages, said burner element comprising a tank having the interior thereof divided by a partition member having gasified fuel passage holes formed in the top wall thereof into two chambers consisting of a combustion chamber and a fuel chamber, said combustion chamber having disposed therein a mat with platinum catalyst attached to the surface thereof and an ignition heater arranged in the proximity of said mat, and said fuel chamber being stuffed with an absorbent material to retain a liquid fuel therein, that one of the gasified fuel passage holes in said partition member which is in confronting relation to said ignition heater being larger in diameter than the rest of the holes so as to supply a greater amount of gasified fuel into said mat therethrough than through the other holes.

2. A body warmer as set forth in claim 1, in which said mat is supported on a mounting base which is trapezoidal shape in cross section and has the lower edges thereof fitted in the corners defined by the top wall of said partition member and the inner wall of said tank.

3. A body warmer as set forth in claim 1, in which said mat and said ignition heater are supported by a support structure which comprises a mounting base resting on said partition member, a mat retainer secured to the top wall of said mounting base and a terminal mounting plate having its lower end fixed to said mounting base, said terminal mounting plate having a terminal mounted on an intermediate portion thereof and its top end removably secured to the top edge of said tank.

4. A body warmer as set forth in claim 1, in which said ignition heater is mounted on a mounting base in such a manner that it is visible through windows formed in the side wall of said mounting base and said tank has windows formed in the side walls thereof in register with said respective windows in the side walls of said mounting base, so that said ignition heater may be inspected from the exterior of the tank.

5. A body warmer as set forth in claim 1, in which said layer of heat insulating material provided on the inner surfaces of the walls of said body has its lower end portion flexed over the bottom of the body with the burner element resting thereon.

6. A body warmer as set forth in claim 1, in which said air intake opening and said heat releasing opening are covered by a dust screen respectively.

7. A body warmer comprising a bag-shaped body composed of an inner wall to be brought into contact with the body of the wearer and an outer wall having its inner surface lined with a layer of heat insulating material, said layer of heat insulating material having its lower end flexed over the bottom of said body, a burner element disposed in the lower portion of said body with its bottom resting on the flexed extension of said heat insulating material layer, flexible ribs provided in the upper portion of said body in spaced relation to define between adjacent ones a heat radiating passage through which the heated gases from said burner element pass, said body having an air intake opening formed in the lower portion of the outer wall thereof and a heat releasing opening formed in the upper portion of the inner wall thereof, said air intake opening and said heat releasing opening being covered by a dust screen respectively, said burner element comprising a tank having the interior thereof divided into two chambers consisting of a combustion chamber and a fuel chamber by a partition member having gasified fuel passage holes formed in the top wall thereof, said combusion chamber having disposed therein a mat with platinum catalyst attached to the surface thereof and an ignition heater arranged in the proximity of said mat, said fuel chamber being stuffed with an absorbent material adapted to retain a liquid fuel therein, that one of said gasified fuel passage holes in the top wall of said partition member which is in confronting relation to said ignition heater being larger in diameter than the rest of the holes, said mat and said ignition heater being mounted on a support structure which comprises a mounting base resting on said partition member, a mat retainer fixed to the top wall of said mounting base and a terminal mounting plate, said mounting base being trapezoidal shape in cross section and having lower edges thereof fitted in the corners defined by the top wall of said partition member and the inner wall of said tank, said terminal mounting plate being fixed at its lower end to said mounting base and having its top end disengageably secured to the top edge of said tank and also having a terminal mounted on an intermediate portion thereof, the side walls of said mounting base each being formed with a window at a location confronting said ignition heater, and the side walls of said tank each being formed with a window in register with said corresponding window in the side wall of said mounting base, so that the ignition heater may be inspected from the exterior of the tank through said windows.

References Cited

UNITED STATES PATENTS

| | | | |
|---|---|---|---|
| 3,110,301 | 11/1963 | Bricker | 126—208 |
| 3,315,658 | 4/1967 | Kamitani | 126—208 |

LOWARD G. FAVORS, Primary Examiner